United States Patent [19]

Rappoport

[11] 4,099,381
[45] Jul. 11, 1978

[54] GEOTHERMAL AND SOLAR INTEGRATED ENERGY TRANSPORT AND CONVERSION SYSTEM

[76] Inventor: Marc D. Rappoport, P.O. Box 10445, Portland, Oreg. 97210

[21] Appl. No.: 831,888

[22] Filed: Sep. 9, 1977

Related U.S. Application Data

[63] Continuation-in-part of Ser. No. 593,773, Jul. 7, 1977, abandoned.

[51] Int. Cl.² ............................................. F03G 7/02
[52] U.S. Cl. ....................................... 60/641; 60/676; 126/270
[58] Field of Search .................. 165/45; 166/268, 272, 166/302, 263; 126/270, 271; 60/641, 676

[56] References Cited

U.S. PATENT DOCUMENTS

| 3,950,949 | 4/1976 | Martin et al. ...................... 60/676 X |
| 4,051,677 | 10/1977 | Van Huissen ........................... 60/641 |

*Primary Examiner*—Allen M. Ontrager
*Attorney, Agent, or Firm*—Chernoff & Vilhauer

[57] ABSTRACT

An energy transport and conversion system for conducting geothermal energy over extended distances without loss of the geothermal energy so as to permit efficient conversion of geothermal energy at a central thermal power station. The energy transport system includes multiple, geographically dispersed wells for preheating a fluid medium, multiple separate conduits for conducting the fluid medium to a common, central thermal power station separated from the geothermal wells by an extended distance and multiple concentrating solar collectors associated respectively with the separate conduits for heating the fluid medium as it moves through the conduits toward the central thermal power station and thereby preventing loss of geothermal energy during such movement despite the extended distance.

2 Claims, 3 Drawing Figures

GEOTHERMAL AND SOLAR INTEGRATED ENERGY TRANSPORT AND CONVERSION SYSTEM

CROSS REFERENCE TO RELATED APPLICATIONS

This is a continuation-in-part of my pending application, Ser. No. 593,773, filed July 7, 1977, now abandoned.

BACKGROUND OF THE INVENTION

The present invention relates to a totally integrated system for transporting and converting geothermal and solar energy cooperatively into mechanical and electrical energy by more efficient means. Although means have been developed for utilizing geothermal energy or solar energy independently to produce heat and electricity, no sufficiently efficient system has been developed cooperatively utilizing the features of these two energy sources.

Exemplary disclosures showing geothermal and/or solar powered energy conversion systems include:

Merz; U.S. Pat. No. 1,493,368
Gill; U.S. Pat. No. 1,993,213
Biggs; U.S. Pat. No. 2,593,963
Walker; U.S. Pat. No. 2,720,489
Sauter; U.S. Pat. No. 2,820,548
Benedek et al; U.S. Pat. No. 2,933,885
Poldony; U.S. Pat. No. 3,070,703
Hughes et al; U.S. Pat. No. 3,459,953
Anderson; U.S. Pat. No. 3,846,986
Russel et al; U.S. Pat. No. 3,868,823
Hutchinson; U.S. Pat. No. 3,845,627
Martin et al; U.S. Pat. No. 3,950,949

Each of these energy conversion systems suffers from one or more of the following inherent disadvantages. Those systems relying solely upon the capture of solar rays as their natural energy source require the dedication of large areas of land to support the collector farms necessary to capture sufficient quantities of solar energy. Such land areas are not always available in sufficiently close proximity to the community to be served. The operation of such systems is also totally dependent upon the receipt of adequate sunlight by the collector array and must be supplemented by energy storage facilities or fueled auxiliary heat generators of large capacity at night and during other periods of inadequate sunshine.

Energy conversion systems that rely solely upon geothermal energy as their natural energy source, because of the relatively low temperatures obtainable from most geothermal wells, must normally also include provisions for the substantial addition of fueled auxiliary heat, in this case to raise the temperature of a fluid medium circulating through the geothermal source to a more readily usable level. The utilization of such auxiliary heat generators is exemplified by the furnace of the solar system disclosed by Ketchum and the gas-fired heater of the geothermal system disclosed by Paull.

All energy conversion systems, including those which combine geothermal and solar energy, fail to utilize efficiently the available geothermal energy thereby precluding use of a large percentage of potential geothermal resources. By way of background pertinent to this basic problem, the following quotation is taken from the findings of the Geothermal Resources Research Conference held in Seattle, Washington on September 18-20, 1972 and funded by the National Science Foundation (NSF):

"There are many geothermal reservoirs (perhaps 80% of all hydrothermal reservoirs) in which the temperature is not high enough to provide fluids that may be used with existing technology to produce economic power." *Geothermal Energy, A National Proposal for Geothermal Resources Research,* at page 43, available from the Superintendant of Documents as stock number 3800-00163.

The foregoing low-temperature problem primarily arises from the fact that prior art devices have heretofore failed to provide geothermal energy transport systems capable of delivering substantially all of the "wellhead" low temperature geothermal energy over extended distances without substantial energy loss. In this connection, it is important to note that the plurality of well-heads of many geothermal reservoirs are geographically dispersed such as to be spaced from one another by distances of up to 20 miles. Accordingly, to use many of the available geothermal resources, known energy conversion systems would necessarily entail the use of small, decentralized electrical power generating plants each in close proximity to a respective low-temperature fluid-dominated geothermal well so as to prevent high conduit heat loss, which would otherwise occur if geothermally heated fluid mediums from multiple geographically dispersed geothermal wells were pumped to larger and more efficient central power generating plants. Even in those situations where useable geothermal energy may be obtained in the form of naturally heated steam that might be present at the wellhead of a particular high-temperature geothermal resource, it is general practice to discard at the wellhead any boiling water that might also be present because of the economics involved with the utilization of the water as an energy source. The consequence, according to *Geothermal Energy, Review of Research and Development,* a 1973 publication of the United Nations Educational, Scientific and Cultural Organization (UNESCO), at page 118, is that:

" . . . a great deal of heat of moderate potential is thrown away (possibly as much as is contained in the steam). . . . Discarding boiling water, from which power could be developed, may appear inherently wasteful but the decision is governed by economics. Clearly to utilize the water at the wellhead would entail a multiplicity of small power plants. (emphasis added).

It will therefore be seen that the failure to provide efficient transport systems for conducting a geothermally-heated fluid medium to centralized power generating plants and other thermal power stations without unacceptable geothermal heat loss en route either precludes use of many low-temperature, water dominated geothermal resources, or necessitates the inefficiency of locating small thermal stations at each wellhead which is usually also unacceptable.

SUMMARY OF THE INVENTION

The energy transport and conversion system of the present invention is directed to a means for utilizing both geothermal energy and solar energy cooperatively in a serially integrated system to produce either mechanical or electrical energy at a level sufficient to meet the varying needs and demands of a community of residential, agricultural, and industrial energy users. More particularly, the present invention is directed to an energy transport and conversion system wherein heat from a number of geographically dispersed geothermal wells is employed to heat a fluid medium, an energy transport system including multiple separate elongate conduits and pumping stations is used to conduct the geothermally heated fluid medium toward a common, central thermal power station spaced away from at least some of the wells, and multiple concentrating solar collectors are associated respectively with the separate elongate conduits along a substantial portion of their lengths to heat the fluid medium as it moves through the separate conduits over an extended distance toward the central thermal power station, thereby substantially preventing loss of the geothermal energy en route. The thermal energy transferred to the fluid medium from both the geothermal wells and the solar collectors is converted into mechanical or electrical energy by an energy conversion system in the central thermal power station, for example by a fluid-driven turbo-generator.

In addition to the substantial prevention of geothermal energy loss, heating of the circulating fluid medium by geothermal means before it is circulated through the solar collectors results in a more rapid heating of the medium to the necessary usable temperature than is possible utilizing either geothermal or solar means alone, while relying less on fueled auxiliary heat sources. Furthermore, heating the separately conveyed fluid mediums by separate solar means en route from the distant, geographically separated geothermal wells requires land area for solar heating constituting merely an easily-obtained narrow strip or right of way, rather than a more valuable and less available large land parcel needed for a high-energy solar collector field.

Provision is made in the system to utilize the excess energy produced by the system during periods of low demand to produce methane, methanol and ammonia by the accelerated decomposition of waste vegetable and other organic material, and/or to produce hydrogen and oxygen by electrolysis of water. To produce methane, methanol and ammonia, surplus geothermal energy not required to heat the circulating fluid medium, or surplus electrical energy produced by the system generator and not required to meet system demands is passed to an electrolytic generator well known to the art to effect the release from the water of hydrogen and oxygen in gaseous form. The various elements and compounds thus produced are captured and separated by conventional means and stored for subsequent use as fuel in a conventional furnace to produce additional thermal energy as a supplement to the thermal energy obtained from the geothermal wells and the solar collectors as necessary, or alternatively for sale as an important by-product of the system. Excess heat transferred to the fluid medium from geothermal and solar energy sources, but not utilized by the system to produce electricity is recaptured, for example, as heat of condensation in a condenser and transferred to a separate fluid medium, preferably water, for circulation directly to users via an underground piping system extending throughout the community to heat water, operate home heating and cooling systems, heat enclosed agricultural fields, and for a variety of industrial purposes.

By so utilizing all of the energy produced by the cooperative natural sources to meet a plurality of demands, e.g., to produce electricity, to provide heat, or to produce various chemicals and chemical compounds from other natural sources for use as fuel, the energy conversion system of the present invention may be tuned to the needs of its community of users by operating the system continuously at its optimum output level and varying the proportion of the output energy allocated to each of the plural demands commensurate with the changing degree of each demand. This is to be distinguished from the more conventional system wherein the level of system output or operation themselves are varied to match the changing demands. For example, the system of the present invention would be designed to meet the peak daytime electrical needs of the community when operating at it's optimum level using both geothermal and solar energy. When the electrical demands on the system decrease, for instance at night and on weekends, rather than decreasing the level of system operation the excess energy output can be utilized to produce combustible and combustion-sustaining chemicals from natural sources for sale or subsequent energy-producing fuel use as described earlier. When the demand again increases and during periods of inadequate sunshine, the chemicals can be combusted or combined to produce heat as a supplement to the thermal energy available from the geothermal wells and the solar collectors.

It is, therefore, a principal objective of the present invention to provide an energy transport and conversion system which utilizes geothermal energy from multiple, geographically dispersed wells to heat a fluid medium and conducts the geothermally heated fluid by separate conduits from the various wells toward a centralized thermal power station through an array of separate solar collectors extending along the respective lengths of the separate conduits, thereby raising the temperature of the medium in each conduit to a level higher than that obtainable from a system utilizing geothermal energy alone while at the same time substantially preventing loss of the said geothermal energy as the fluid mediums moves from the various dispersed geothermal sources to the central power station.

It is a principal feature of the present invention that all of the energy converted from naturally occurring geothermal sources is substantially completely utilized without waste by use of an efficient centralized thermal power station drawing energy from multiple, geographically dispersed geothermal wells.

The foregoing objectives, features and advantages of the present invention will be more readily understood upon consideration of the following detailed description of the invention taken in conjunction with the accompanying drawings.

DETAILED DESCRIPTION OF THE PREFERRED EMBODIMENT

Figures 2, 3:
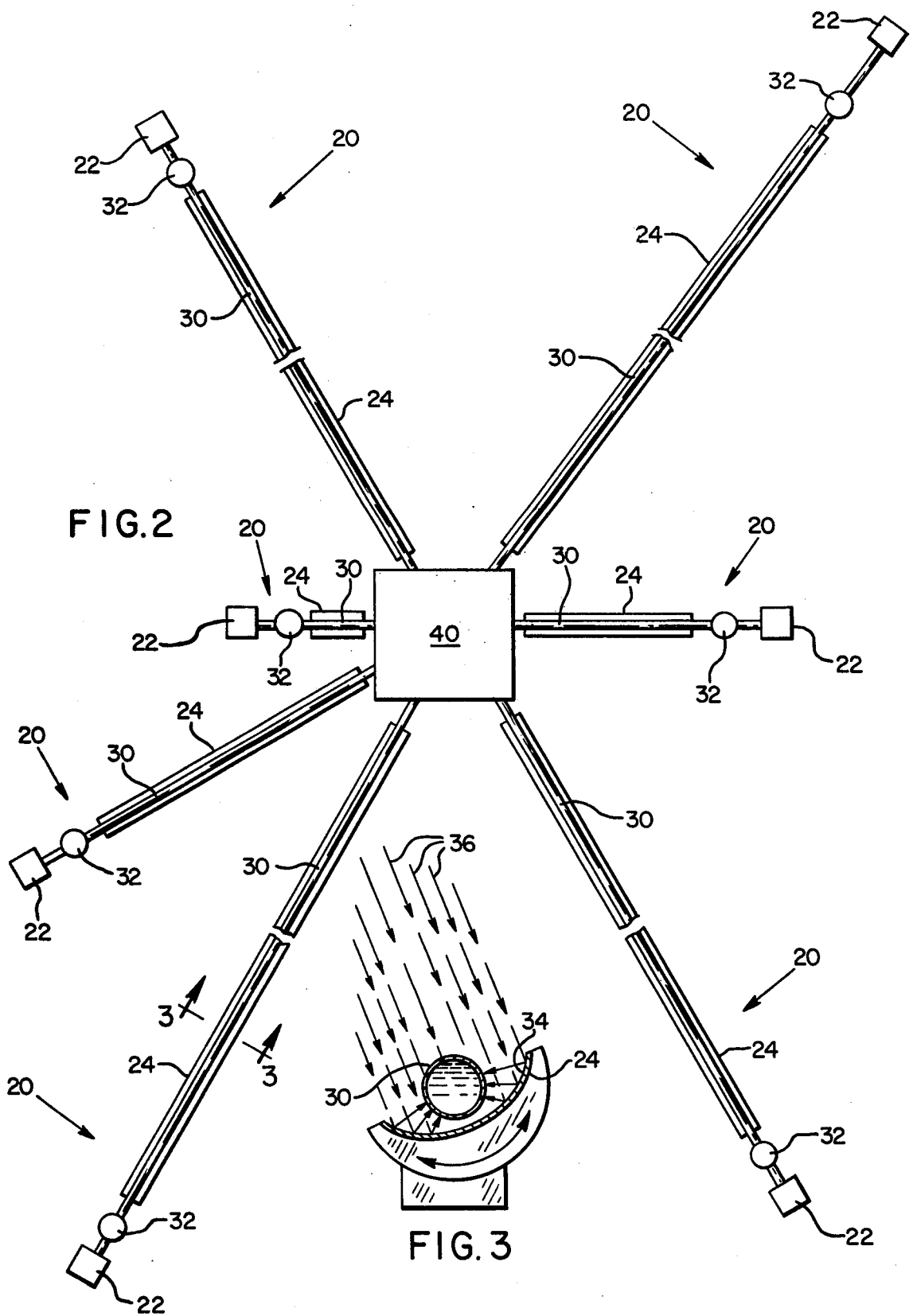
FIG. 2 is a simplified schematic drawing of the energy transport and conversion system of the present invention showing multiple geographically dispersed geothermal wells coupled over extended distances by separate conduits with a common, central thermal power station.
FIG. 3 is a detailed view taken along line 3—3 of FIG. 2 to indicate an exemplary conduit and associated concentrating solar collector.

Referring now to the drawings, initially in FIG. 2, an exemplary embodiment of the present energy transport and conversion system is schematically shown as an energy transport system 20 coupled with a common central thermal power station 40 for receiving thermal energy from the fluid medium in the transport system, the thermal station preferably including an energy conversion system as hereinafter described.

The exemplary energy transport system 20 includes multiple geographically dispersed geothermal wells 22 spaced from one another and arranged in spaced-apart relation to the thermal power station 40 for receiving geothermal energy at a geothermal temperature level in the range of about 100° F to about 300° F from naturally heated material situated below the earth's surface and for transferring the geothermal energy from each of the wells to a fluid medium. The energy transport system 20 further includes multiple separate elongate conduits 30 each coupled between a respective one of the geothermal wells and the central thermal power station 40 and a plurality of pumping stations 32 each associated with a respective one of the separate elongate conduits for conducting the fluid medium from the respective geothermal well toward the thermal power station. A plurality of separate concentrating solar collectors 24, each associated with a respective one of the separate elongate conduits are arranged respectively in longitudinally extending relation to the respective conduits along a majority of their length. Each collector 24 should preferably extend substantially uniformly along the length of a respective conduit, it being contemplated that substantially uniformly distributed spaces between adjacent selections of a respective collector 24 would be provided for mechanical or other reasons. As best seen in FIG. 3, each concentrating solar collector preferably includes an elongate parabolic reflector 34 disposed with respect to a respective one of the elongate conduits 40 for transferring substantially all of the solar energy 36 impinging thereon to the fluid medium moving through the elongate conduit thereby heating the fluid medium at a high solar temperature level so as to deliver a fluid medium to the thermal power station 40 having an input temperature level of about 450° F to about 600° F.

By concentrating solar energy along the majority of the length of each elongate conduit 26, the energy transport system 20 not only provides the advantageous superheating of the fluid medium but also prevents any substantial loss of geothermal energy as the fluid medium moves over an extended distance from a respective geothermal well toward the thermal power station thereby permitting efficient utilization of the available energy obtained at each geothermal source. This in turn enables efficient utilization of a common central thermal power station fed by multiple low temperature, water-dominated, geographically dispersed geothermal wells which may be spaced apart from one another and from the thermal power station by distances of at least several miles.

Figure 1:
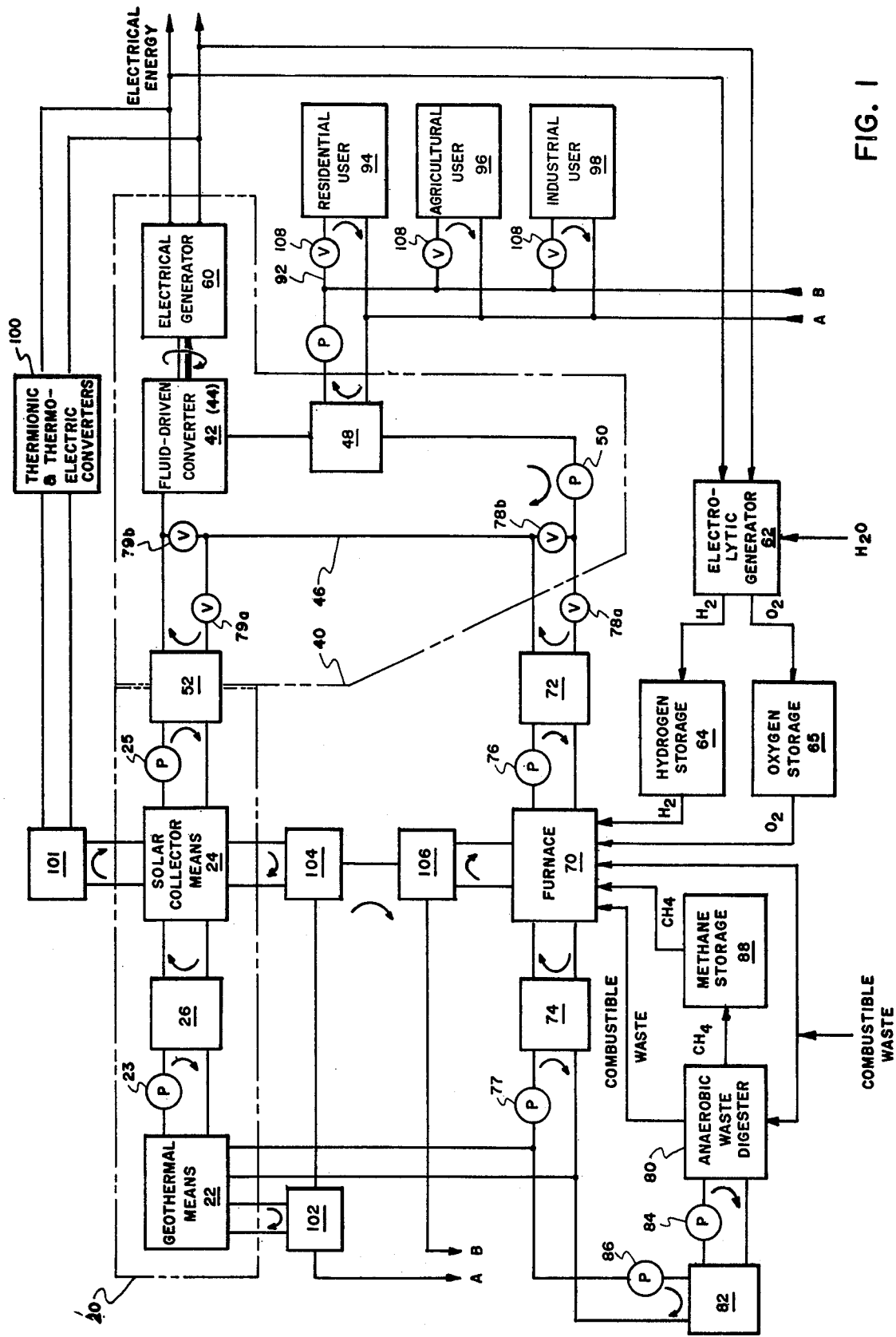
FIG. 1 is a schematic drawing illustrating an exemplary embodiment of the present energy transporting and collecting system with all of its optional variations in combination, except that only a single geothermal heat source and solar collector is shown for simplicity of explanation.

Turning now to FIG. 1, an exemplary energy transport and conversion system of the present invention (involving only one of the wells 22 for simplicity) is seen to comprise: an energy transport system, enclosed by dashed lines and denoted generally as 20, that includes a geothermal means 22 for transferring thermal energy from a naturally heated underground material to a fluid medium, either aqueous or non-aqueous, and concentrating solar collector means 24 for transferring additional thermal energy from solar rays to the same fluid medium; and a central thermal power station, also enclosed by dashed lines and denoted generally as 40, that includes a fluid-driven convertor 42, for example, a steam-driven turbine 44, and an associated fluid-conductor circuit 46 for converting thermal energy transferred to the fluid medium by the geothermal means and the concentrating solar collector means into electrical and mechanical energy. A separate fluid medium can be circulated through each of geothermal means 22 and concentrating solar collector means 24 in the direction of the curved arrows by fluid pumps 23 and 25, respectively, and thermal energy can be transferred from the geothermal fluid medium to the solar fluid medium by an intercoupling heat exchanger 26 or its equivalent. Alternatively, in those geographical areas where a fluid medium can be obtained from or circulated through a geothermal heat source without being or becoming significantly corrosive, pump 23 and heat exchanger 26 may be omitted and the same fluid medium circulated through both the geothermal means 22 and the concentrating collector means 24 by a single pump 25 alone, which, in such case, would be equivalent to the single pumps 32 in the separate conduits of FIG. 2. In either case, thermal energy extracted from the naturally heated underground material by the geothermal means 22 is employed to heat the fluid medium circulating through the concentrating solar collector means 24 initially to a predetermined temperature (for example, in the range from about 190° F to about 300° F). Thermal energy extracted from solar rays by the concentrating solar collector means 24 is then employed to raise the temperature of the medium to a still higher temperature (for example, in the range from about 450° F to about 600° F).

If the fluid-driven means 42 is a steam turbine or its equivalent, then the central thermal power station 40 would also include, besides the turbine and the fluid conductor circuit 46, a condenser/heat exchanger 48 and fluid pump 50, as shown in FIG. 1, for converting the steam leaving the turbine back into water and for circulating the water back through the power station in the direction of the arrows. (The heat exchanger portion of condenser/heat exchanger 48 is discussed below.) Although the water that is circulated through the turbine might be circulated through the concentrating solar collector means if the solar collector fluid medium were not geothermal water, separate fluid media could be employed, in which case a heat exchanger 52 would be connected between the solar collector conduits and the fluid circuit of the power station as shown in FIG. 1 to transfer thermal energy from the former to the latter. For example a liquid metal having a boiling point above about 600° F, such as Sodium, could be circulated through the concentrating solar collector means 24 and water with its substantially lower boiling point could be circulated through the power station fluid circuit 46. In either case, still assuming that fluid-driven means 42 is a steam-driven turbine or its equivalent, provision should be made between the concentrating solar collector means 24 and the turbine for a change in state of the water, circulating through the turbine, from a liquid state to a gaseous steam state. Preferably such provision is conveniently made in heat exchanger 52 by means well-known to the art. The gaseous steam is then transformed back into liquid water as it passes through condenser/heat exchanger 48 upon leaving the turbine.

It is understood that phase changing media other than water could also be employed as the fluid medium of the power station 40. It is also understood that fluid-driven means other than a steam-driven turbine may be employed with attendant changes to the system without departing from the concept of the invention. If, for example, fluid-driven means 42 is a gas turbine, the fluid medium circulating through the power station would be maintained at all times in the gaseous state and condenser 48 would therefore be unnecessary.

The mechanical energy produced by the power station 40 is used in the preferred embodiment to drive an electrical generator 60 to produce electricity as the primary output of the system.

A possible optional auxiliary source of thermal energy for the energy conversion system of the present invention is the heat produced by the combustion of combustible waste materials in a furnace 70 coupled to the power station 40 via a heat exchanger 72 as shown in FIG. 1. It is anticipated that these waste materials will be combusted primarily during those periods of time when additional thermal energy might be needed to compensate for inadequate thermal energy conversion within the concentrating solar collector means 24; for example, during the night and during prolonged periods of insufficient sunlight. As with the concentrating solar collector means 24, separate fluid media may be circulated through the furnace 70 and the thermal station 40 in the direction of the curved arrow, or the same fluid medium may be circulated through both, thereby obviating the need for heat exchanger 72. If separate fluid media are employed, a fluid pump 76 is included in the circuit of furnace 70, as shown in FIG. 1, to circulate the fluid medium therethrough. In either case, the fluid media circulating through the furnace is preferably heated to a relatively high temperature (for example, in the range from about 450° F to about 600° F) before its thermal energy is transferred to the thermal station.

Valve pairs 78a, b and 79a, b are connected in the power station fluid circuit 46 as shown in the figure to permit the concentrating solar collector means 24 and the furnace 70 to be selectively de-coupled from the circuit for maintenance or to replace one another. For example, the furnace 70 may be disconnected from the conductor circuit 46 by opening valve 78a and closing valve 78b.

Fuel materials may be combusted directly in furnace 70. Preferably the fuel is manufactured by the system itself from natural materials at hand. For example, decomposable vegetable and other organic material may be permitted to anaerobically decompose in a waste digester 80 that is heated to about 180° F by thermal energy from geothermal means 22, by circulating a fluid medium through the geothermal means to a separate fluid medium circulating through the waste digester by way of an intercoupling heat exchanger 82 and associated pumps 84 and 86. Alternatively, the heat may be drawn from excess heat of the fluid medium circulating through the power station 40, for example, from heat exchanger 48. The anaerobic decomposition of the organic material, enhanced by the heat, will produce gaseous methane and ammonia and liquid methanol which is captured and separated by any suitable means known to the art and stored in a storage facility 88 for later combustion in furnace 70 or for sale as additional products of the energy conversion system.

For more rapid heating, the fluid medium that is circulated through furnace 70 is preheated to a temperature in the range from abbout 190° F to about 300° F by the geothermal means 22, either directly or via an intercoupling heat exchanger 74 and associated fluid pump 77, in a manner similar to that in which heat is transferred by the geothermal means to the fluid medium circulating through the concentrating solar collector means 24. Because of the distance involved between the geothermal means 22 and the furnace 70, concentrating solar collectors along the length of the interconnecting conduits can also be used here to prevent loss of geothermal energy en route. By preheating the fluid medium circulating through the furnace 70 before it is heated by the furnace, the temperature of the medium is raised to the higher final temperature more rapidly and with less fuel and furnace capacity than is possible using the heat of combustion alone.

As previously mentioned, the primary energy product of the energy conversion system of the present invention is the electricity produced by the generator 60 coupled to the fluid-driven means 42. An additional important product of the system is the thermal energy remaining in the fluid medium of the power station 40 after the medium passes through the fluid-driven means 42 and before it is pumped back through the system. Preferably this heat is transferred, by the heat exchanger portion of the condenser/heat exchanger 48 coupled between the fluid-driven means 42 and pump 50, to a fluid medium in a separate distribution network 92 for circulation among one or more of a number of residential, agricultural, and industrial users 94, 96, and 98 respectively in a manner analogous to that in which electrical current is distributed. Heat can also be transferred directly to the distribution network from geothermal means 22, concentrating solar collector means 24, and furnace 70 via heat exchangers 102, 104, and 106, respectively and conduits such as A and B having associated concentrating solar collectors along their length to prevent heat loss en route. At each user's site, facilities would be provided to either use the thermal energy of the medium directly through a heat exchanger or to store the thermal energy for later use. An example of such a direct use is the circulation of the medium through the bedding soil of an agricultural facility to enhance plant growth, and an example of such storage is the circulation of the medium through a residential water heater reservoir tank for heat transfer from the medium to the reservoir.

Storage of energy at a user's site includes the establishment of a base energy level by transferring thermal energy into a suitable storage medium, for example, the water in the residential water heater reservoir, to maintain the storage medium at an above-ambient base temperature. As demands are placed on the storage medium, such as by drawing water from the reservoir, temperature sensitive valves 108 in the distribution network 92 are automatically activated to increase the flow through the storage medium of the fluid medium circulating through the distribution network, thereby increasing the transfer of thermal energy from the circulating fluid medium to the storage medium. As the user's demands decrease, the temperature sensitive valves automatically adjust to reduce the flow of the circulating fluid medium through the storage medium back to the level required to maintain the storage medium at it's base temperature. By maintaining a base energy level at each user's site, a smoothing of the demands are satisfied by the base energy level maintained in the storage medium and the subsequent or continuing demands are met by the fluid medium circulating through the distribution network.

During those periods when the demand for electricity from the system is low, excess electrical energy is utilized to produce hydrogen and oxygen from water by passing a current through an electrolytic generator 62 as indicated in the figure. The separated hydrogen and oxygen thus produced is captured by means known to the art and stored in storage facilities 64 and 65 for subsequent combination and combustion in furnace 70 or for sale as further products of the system.

It will be noted that the energy transport and conversion system of the present invention comprises a number of closed loops each of which utilizes or returns to the system all of the thermal energy that it receives. In this manner all thermal energy input to the system is utilized to generate mechanical or electrical energy, to produce heat for residential, agricultural and industrial users, and to produce chemical compounds for subsequent use as fuel, without adding heat to the ecosphere and without increasing the amount of pollution that is released to the atmosphere. In fact, by anaerobically converting into methane, methanol and ammonium a portion of those inorganic waste products that are normally disposed of by combustion, the system of the present invention actually decreases the amount of airborne pollution that is released to the atmosphere.

Provision is optionally included in the energy transport and conversion system of the present invention for the direct conversion of thermal energy from the combined geothermal means 22 and concentrating solar collector means 24 into electricity by conventional fluid-driven thermo-electric or thermionic converters 100, heat for which is supplied by circulating the solar collector fluid medium through the converters directly or by transferring the heat from the solar collector fluid medium to the converters indirectly through an intercoupling heat exchanger 101. The thermoelectric or thermionic converters 100, as functional equivalents of the power station 40, are not critical to the operation of the system in it's preferred embodiment, but are included in the system as examples of more rapidly responding energy conversion means employable to augment the slower reacting, more conventional steam or gas turbine. Electrical energy thus produced is fed into the same grid as that fed by the electrical generator 60.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An energy transport and conversion system for conducting geothermal energy from a plurality of geographically dispersed geothermal sources to a common central thermal power station without substantial loss of geothermal energy comprising:
   (a) multiple geothermal means spaced from one another, each for transferring geothermal energy at a predetermined geothermal temperature level from a naturally heated material beneath the earth's surface to a fluid medium;
   (b) a central thermal power station spaced away from each of said multiple geothermal means including means for receiving thermal energy from said fluid medium;
   (c) multiple separate elongate conduits, each respectively coupled between one of said multiple geothermal means and said thermal power station for conducting said fluid medium therethrough toward said central thermal power station; and
   (d) multiple concentrating solar collector means each being associated with a respective one of said separate elongate conduits and arranged in longitudinally extending relation thereto, for transferring focused solar energy to said fluid medium in said separate elongate conduits at a temperature level higher than said geothermal temperature level as said fluid medium moves through the conduit toward said central thermal power station.

2. A method for efficiently transporting naturally occurring low-temperature geothermal energy from a plurality of geographically dispersed geothermal wells to a common central thermal power station spaced an extended distance from each of said geothermal wells without substantial loss of said geothermal energy, comprising the steps of:
   (a) receiving geothermal energy at a predetermined geothermal temperature level from naturally heated material situated below the earth's surface through multiple geothermal wells spaced from one another;
   (b) transferring said geothermal energy from each of said wells to a fluid medium;
   (c) conducting said geothermal energy by said fluid medium from each of said multiple geothermal wells through respective separate elongate conduits toward said central thermal power station;
   (d) transferring focused solar energy at a temperature level higher than said geothermal temperature level to the fluid medium in each of said separate elongate conduits as the fluid medium moves therethrough toward said central thermal power station; and
   (e) after steps (a), (b), (c) and (d), receiving thermal energy from said fluid medium at said central thermal power station.

* * * * *

UNITED STATES PATENT AND TRADEMARK OFFICE
CERTIFICATE OF CORRECTION

PATENT NO. : 4,099,381
DATED : July 11, 1978
INVENTOR(S) : Marc D. Rappoport

It is certified that error appears in the above-identified patent and that said Letters Patent are hereby corrected as shown below:

Col. 5, line 4    Change "in" to --to--.

Col. 9, line 44   Change "thermoelectric" to --thermo-electric--.

Col. 10, line 7   After the word "of" add the word --said--.

Signed and Sealed this

Twenty-seventh Day of February 1979

[SEAL]

Attest:

RUTH C. MASON
Attesting Officer

DONALD W. BANNER
Commissioner of Patents and Trademarks